United States Patent
Ponukumati (10) Patent No.: US 9,282,536 B2
(45) Date of Patent: Mar. 8, 2016

(54) DEVICES AND METHODS FOR FACILITATING PAGING CHANNEL ARBITRATION IN MULTI-SIM ARCHITECTURES

(71) Applicant: QUALCOMM Incorporated, San Diego, CA (US)

(72) Inventor: Dhananjaya Sarma Ponukumati, Hyderbad (IN)

(73) Assignee: QUALCOMM Incorporated, San Diego, CA (US)

(*) Notice: Subject to any disclaimer, the term of this patent is extended or adjusted under 35 U.S.C. 154(b) by 170 days.

(21) Appl. No.: 13/965,505

(22) Filed: Aug. 13, 2013

(65) Prior Publication Data
US 2015/0050952 A1   Feb. 19, 2015

(51) Int. Cl.
| | |
|---|---|
| *H04W 68/00* | (2009.01) |
| *H04W 68/02* | (2009.01) |
| H04W 88/06 | (2009.01) |
| H04W 8/18 | (2009.01) |

(52) U.S. Cl.
CPC .............. *H04W 68/02* (2013.01); *H04W 8/183* (2013.01); *H04W 88/06* (2013.01)

(58) Field of Classification Search
CPC ... H04W 68/02; H04W 68/025; H04W 88/06; H04W 4/00–4/003; H04W 4/06; H04W 4/16; H04W 4/20
USPC ................ 455/458, 432.1–444, 552.1, 553.1
See application file for complete search history.

(56) References Cited

U.S. PATENT DOCUMENTS

| 5,870,673 A | 2/1999 | Haartsen |
|---|---|---|
| 8,224,356 B2 | 7/2012 | Butler et al. |

(Continued)

FOREIGN PATENT DOCUMENTS

| EP | 2605559 A1 | 6/2013 |
|---|---|---|
| WO | 2013014000 A1 | 1/2013 |

OTHER PUBLICATIONS

CATT: "The collision handling of paging for CSFB procedure" 3GPP Draft; CI-092118, 3rd Generation Partnership Project (3GPP), Mobile Competence Centre ; 650, Route Des Lucioles ; F-06921 Sophia-Antipolis Cedex ; France, no. Sophia Antipolis (France); Apr. 27, 2009, XP050337650 [retrieved on Apr. 27, 2009].

(Continued)

*Primary Examiner* — San Htun
(74) *Attorney, Agent, or Firm* — The Marbury Law Group, PLLC (57) ABSTRACT

Access terminals employing multiple subscriptions are adapted for paging channel arbitration. According to at least one example, an access terminal can determine whether there will be a collision between a first paging channel associated with a first subscription and a second paging channel associated with a second subscription. The access terminal may additionally determine whether a time period between a paging indicator bit for the first subscription and the second paging channel is greater than or equal to an amount of time it takes to switch from operating on the first subscription to operating on the second subscription. The access terminal can monitor for a paging indicator bit indicating an incoming paging message on the first paging channel and, if no paging message is indicated, may switch to the second subscription to monitor the second paging channel for incoming paging messages. Other aspects, embodiments, and features are also included.

23 Claims, 7 Drawing Sheets

(56) References Cited

U.S. PATENT DOCUMENTS

| | | | | |
|---|---|---|---|---|
| 2009/0305728 A1* | 12/2009 | Huang | ............... | H04W 68/02 455/458 |
| 2010/0202430 A1* | 8/2010 | Chin | ............... | H04W 68/12 370/342 |
| 2010/0203906 A1* | 8/2010 | Fang | ............... | H04W 68/025 455/458 |
| 2012/0108273 A1* | 5/2012 | Lee | ............... | H04W 68/02 455/458 |
| 2012/0172029 A1* | 7/2012 | Lai | ............... | H04W 68/00 455/422.1 |
| 2012/0231802 A1 | 9/2012 | Ngai | | |
| 2012/0264390 A1 | 10/2012 | Clevorn et al. | | |
| 2012/0269173 A1 | 10/2012 | Chin et al. | | |
| 2012/0289285 A1 | 11/2012 | Clevorn et al. | | |
| 2013/0150013 A1* | 6/2013 | Liu | ............... | H04W 8/183 455/418 |
| 2013/0150095 A1* | 6/2013 | Mehio | ............... | H04W 8/183 455/458 |
| 2013/0250095 A1* | 9/2013 | Inoue et al. | ............... | 348/94 |

OTHER PUBLICATIONS

International Search Report and Written Opinion—PCT/US2014/050572—ISA/EPO—Dec. 15, 2014.

* cited by examiner

DEVICES AND METHODS FOR FACILITATING PAGING CHANNEL ARBITRATION IN MULTI-SIM ARCHITECTURES

TECHNICAL FIELD

The following relates generally to wireless communication, and more specifically to methods and devices for arbitrating and/or resolving paging conflicts between two or more subscriptions in multi-SIM environments.

BACKGROUND

Wireless communications systems are widely deployed to provide various types of communication content such as voice, video, packet data, messaging, broadcast, and so on. These systems may be accessed by various types of access terminals configured to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

In some instances, access terminals can be configured to support a plurality of subscriptions (e.g., via a plurality of subscriber identity modules (SIMs)). An access terminal with multiple subscription capabilities (e.g., multiple SIMs) may be able to use multiple services without the need to carry multiple access terminals at the same time. Each subscription (e.g., SIM) may be associated with a different subscriber account, a different network, and/or a different radio access technology (RAT). In such examples, the same access terminal can be used for business and private use with separate numbers and separate bills, or for travel when an additional SIM is employed for a visited country. Some multiple subscription configurations enable each subscription to be active simultaneously, allowing calls to be received on either number at any given time (e.g., Dual SIM Dual Standby (DSDS), Dual SIM Dual Active (DSDA), Triple SIM Triple Standby (TSTS)).

Various features are desirable to optimize the performance of access terminals employing multiple subscriptions.

SUMMARY

In some instances, it may be beneficial to optimize the arbitrations of paging channels between multiple subscriptions. Various features and aspects of the present disclosure are configured to facilitate paging channel arbitration between two or more subscriptions in multi-SIM environments.

According to at least one aspect of the disclosure, access terminals may include a communications interface and a plurality of subscription modules. The plurality of subscription modules may include a first subscription module associated with a first subscription, and a second subscription module associated with a second subscription. A processing circuit can be coupled to the communications interface and the plurality of subscription modules. The processing circuit may be configured to determine whether there will be a collision between a first paging channel associated with the first subscription module and a second paging channel associated with the second subscription module, and if so determine whether a time period between a paging indicator bit associated with the first subscription module and the second paging channel is greater than or equal to an amount of time it takes the processing circuit to switch from the first subscription to the second subscription. A paging indicator channel may be monitored via the communications interface for a paging indicator bit indicating an incoming paging message for the first subscription. When there is no paging message indicated by the paging indicator bit, the processing circuit may switch from the first subscription to the second subscription to monitor the second paging channel via the communications interface for an incoming paging message.

Further aspects provide methods operational on access terminals and/or access terminals including means to perform such methods. One or more examples of such methods may include determining whether there will be a collision between a first paging channel associated with a first subscription module and a second paging channel associated with a second subscription module, and if so determining whether a time period between a paging indicator bit associated with the first subscription module and the second paging channel is greater than or equal to an amount of time it takes the access terminal to switch from operating on the first subscription module to operating on the second subscription module. A paging indicator channel may be monitored for a paging indicator bit indicating an incoming paging message. A switch from operating on the first subscription module to operating on the second subscription module can occur when there is no paging message indicated by the paging indicator bit. The second paging channel may be monitored for incoming paging messages.

Still further aspects include non-transitory processor-readable storage media storing programming operational on a computer, such as an access terminal According to one or more examples, such programming may be configured to cause the processor circuit of an access terminal to determine that a first paging channel associated with a first subscription module is scheduled to at least partially overlap with a second paging channel associated with a second subscription module, and if so determine whether a time period between a paging indicator bit associated with the first subscription module and the second paging channel is greater than or equal to an amount of time it takes the access terminal to switch from operating on the first subscription module to operating on the second subscription module. The programming may further be configured to cause a computer to monitor the paging indicator bit for an indication of an incoming paging message. When there is no paging message indicated by the paging indicator bit, the programming may be configured to cause a computer to switch from operating on the first subscription module to operating on the second subscription module, and to monitor the second paging channel for incoming paging messages.

Other aspects, features, and embodiments associated with the present disclosure will become apparent to those of ordinary skill in the art upon reviewing the following description in conjunction with the accompanying figures.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 6, comprising

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below with reference to specific protocols, systems, and technologies. However, those of ordinary skill in the art will recognize that one or more aspects of the present disclosure may be employed and included in one or more other wireless communication protocols, systems, and technologies.

Various features and aspects of the present disclosure facilitate paging channel arbitration between two or more subscriptions in access terminals employing multiple subscriptions. An access terminal employing multiple subscriptions may determine that the paging channels for two subscriptions have a conflict, where at least one of the subscriptions utilizes a paging indicator bit received on a paging indicator channel to indicate whether a paging message will be received on the associated subscription. The access terminal can determine that the time period between a paging indicator bit associated with a first subscription and paging channel occurrence associated with the second subscription is greater than or equal to an amount of time it takes the processing circuit to switch from the first subscription to the second subscription. When this is true, then the access terminal can monitor the paging indicator channel for a paging indicator bit indicating an incoming paging message for the first subscription. When there is no paging message indicated by the paging indicator bit, the access terminal can switch from the first subscription to the second subscription to monitor the second paging channel for an incoming paging message.

Figure 1:
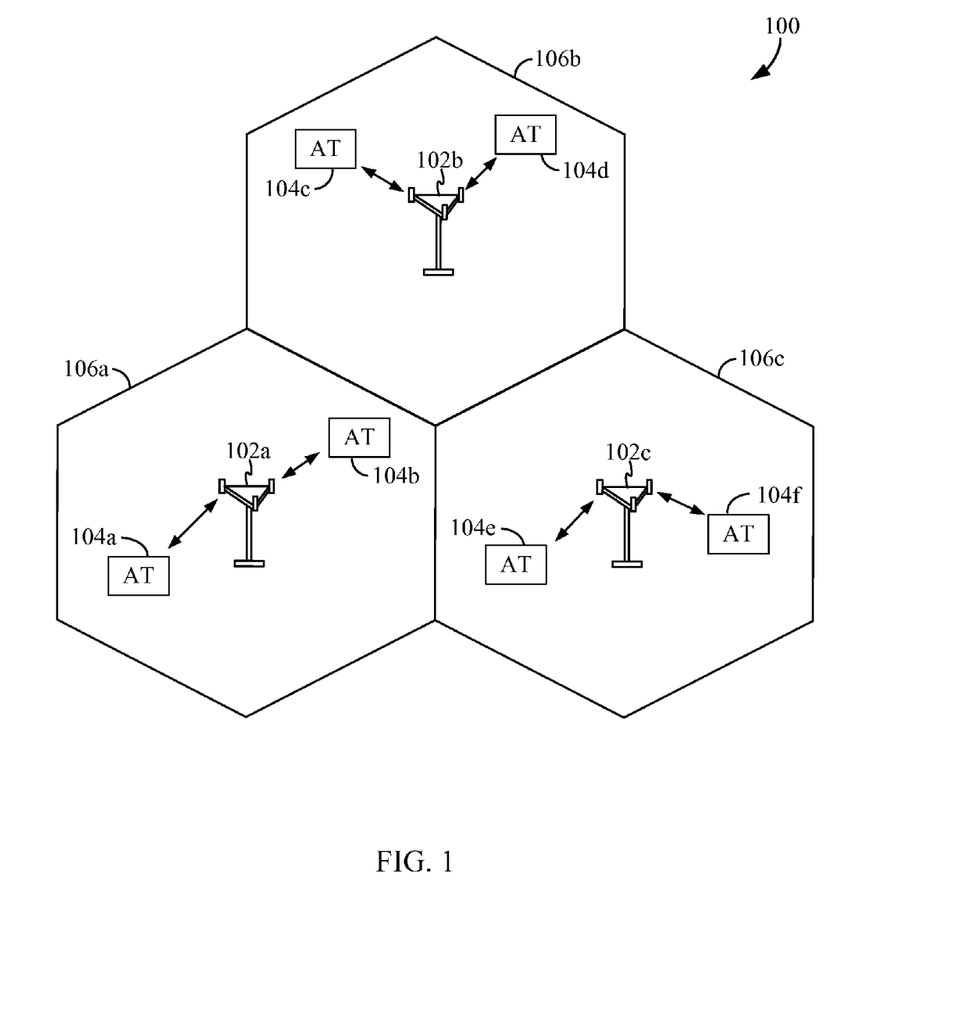
FIG. 1 is a block diagram of a network environment in which one or more aspects of the present disclosure may find application.

Referring now to FIG. 1, a block diagram of a network environment in which one or more aspects of the present disclosure may find application is illustrated. The wireless communications system 100 is configured to facilitate wireless communication between one or more base stations 102a, 102b, and/or 102c (referenced generally as base stations 102) and access terminals 104a, 104b, 104c, 104d, 104e, and/or 104f (referenced generally as access terminals 104). The base stations 102 and access terminals 104 may be configured to interact with one another through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the access terminals 104 via a base station antenna. The base stations 102 may each be implemented generally as a device configured to facilitate wireless connectivity (for one or more access terminals 104) to the wireless communications system 100. Such a base station 102 may also be referred to by those skilled in the art as a base transceiver station (BTS), a radio base station, a radio transceiver, a transceiver function, a basic service set (BSS), and extended service set (ESS), a node B, a femto cell, a pico cell, or some other suitable terminology.

Figure 2:
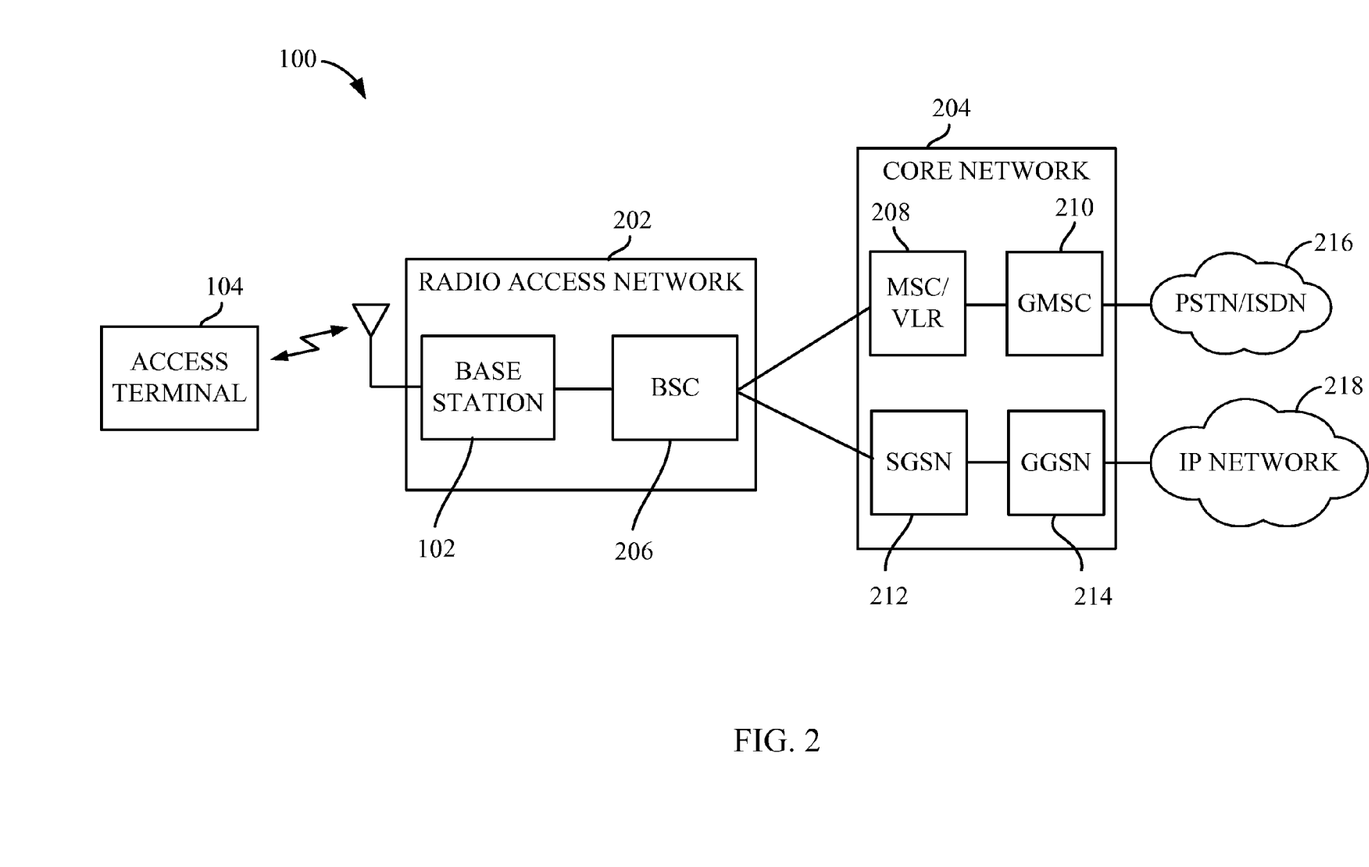
FIG. 2 is a block diagram illustrating select components of the wireless communication system of FIG. 1 according to at least one example.

The base stations 102 are configured to communicate with the access terminals 104 under the control of a base station controller (see FIG. 2). Each of the base station 102 sites can provide communication coverage for a respective geographic area. The coverage area 106 for each base station 102 here is identified as cells 106a, 106b, or 106c (referenced generally as 106). The coverage area 106 for a base station 102 may be divided into sectors (not shown, but making up only a portion of the coverage area). In various examples, the system 100 may include base stations 102 of different types.

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, and/or other communication/computing device which communicates, at least partially, through a wireless or cellular network.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally configured to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), a UMTS Terrestrial Radio Access Network (UTRAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as an EIR, a HLR, a VLR and/or a AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

As an access terminal 104 operates within the wireless communication system 100, the access terminal 104 may employ an idle mode, during which the access terminal 104 may monitor control channels, such as a paging channel (PCH) for paging messages. Such paging messages may include messages that alert the access terminal 104 to the occurrence of an incoming voice or data call as well as control/overhead messages that carry system information and other information for the access terminal 104. Paging messages may be sent on the paging channel to the access terminal 104 at designated time intervals. That is, instead of monitoring the paging channel continuously, the access terminal 104 can conserve power by periodically monitoring the paging channel in a slotted idle mode, which may also be referred to by those of skill in the art as discontinuous reception mode or DRX mode. In the slotted idle mode, the access terminal 104 wakes up from a "sleep" state at known time intervals, enters an "awake" state and processes the paging channel for messages. If additional communication is not required, the access terminal 104 can return to the sleep state until the next designated time.

In some instances, one or more of the access terminals 104 operating within the wireless communications system 100 may be configured to support a plurality of subscriptions (e.g., via a plurality of subscriber identity modules (SIMs)), such as Dual SIM Dual Standby (DSDS), Dual SIM Dual Active (DSDA), Triple SIM Triple Standby (TSTS), etc. Each subscription may be associated with a different subscriber account, a different network, and/or a different radio access technology (RAT). In some configurations, the multiple SIMs employed by an access terminal 104 may share a radio chain so that only one subscription can actively receive communications at a given moment in time. As a result, only one subscription may typically monitor its paging channel (PCH) for paging messages at a given time. When a slotted idle mode is employed by two or more subscriptions, it may occur that the designated time period for monitoring the paging channel for two or more subscriptions can fall during at least a portion of the same time interval. In such cases, the access terminal 104 typically identifies a conflict, and only one of the plurality of subscriptions will be able to monitor its associated paging channel.

Page conflict resolution is an important performance aspect of multi subscription (e.g., multi-SIM) access terminals 104. For instance, the access terminal 104 must be able to monitor the paging channel associated with each subscription (e.g., each SIM) to be able to respond to incoming calls. However, changing between paging channels for each subscription to monitor for incoming pages is not instantaneous and conflicts may occur when paging slots associated with different subscriptions overlap.

Figure 3:
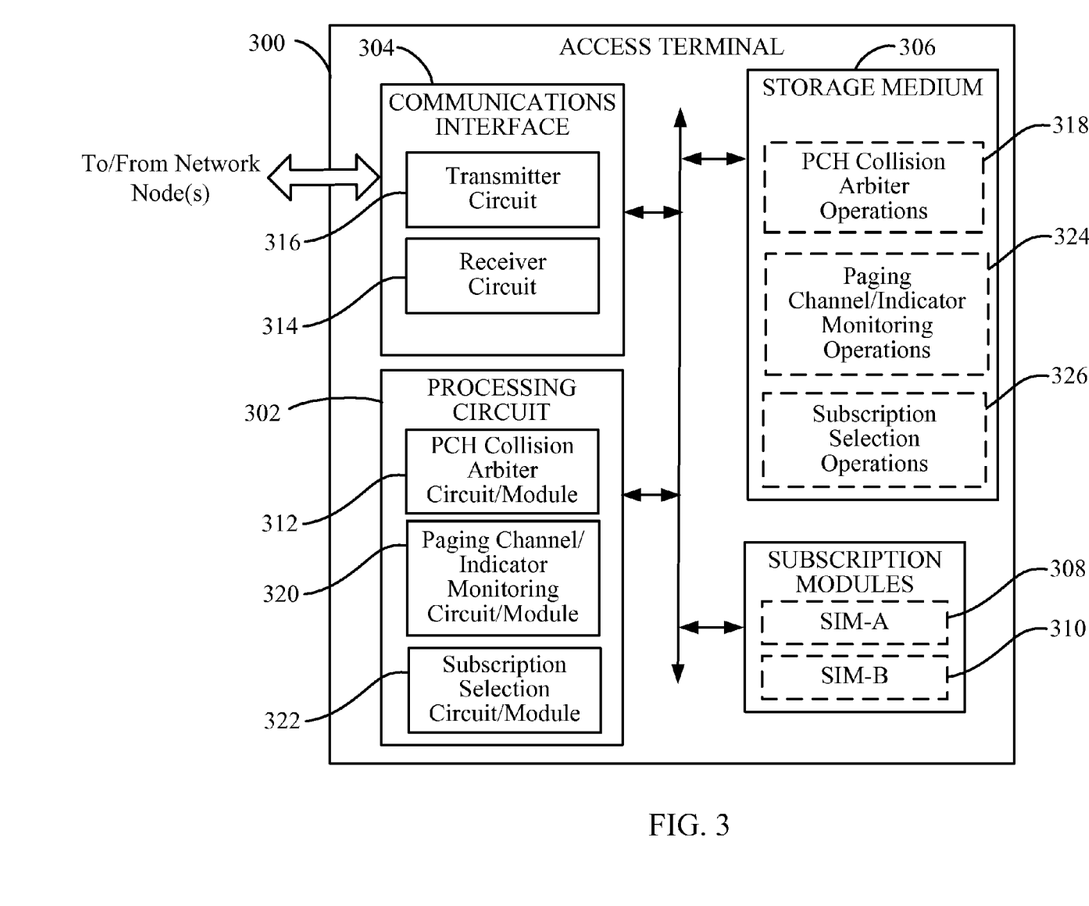
FIG. 3 is a block diagram illustrating select components of an access terminal according to at least one example.

According to at least one aspect of the disclosure, access terminals are configured to facilitate paging conflict resolution between multiple subscriptions. FIG. 3 is a block diagram illustrating select components of an access terminal 300 according to at least one example of the present disclosure. The access terminal 300 includes at least one processing circuit 302 coupled to or placed in electrical communication with a communications interface 304 and a storage medium 306.

According to an aspect of the present disclosure, the access terminal 300 is configured to employ multiple subscriptions. Accordingly, the access terminal 300 further includes two or more subscription modules represented generally by SIM-A 308 and SIM-B 310. The subscription modules 308, 310 may also be referred to interchangeably herein as a subscriber identity module (SIM). However, the one or more subscription modules may be one or more suitable subscription modules including, but not limited to, a Subscriber Identity Module (SIM), Removable User Identity Module (R-UIM), Universal Integrated Circuit Card (UICC), CDMA Subscriber Identity Module (CSIM), Universal Subscriber Identity Module (USIM)), etc. SIM-A 308 and SIM-B 310 may be associated with a different service subscription, different network access over the same or different network type, and/or use the same or different radio access technologies.

The processing circuit 302 is arranged to obtain, process and/or send data, control data access and storage, issue commands, and control other desired operations. The processing circuit 302 may include circuitry configured to implement desired programming provided by appropriate media in at least one example. For example, the processing circuit 302 may be implemented as one or more processors, one or more controllers, and/or other structure configured to execute executable programming. Examples of the processing circuit 302 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 302 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 302 are for illustration and other suitable configurations within the scope of the present disclosure are also contemplated.

The processing circuit 302 is adapted for processing, including the execution of programming, which may be stored on the storage medium 306. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 302 may include a paging channel (PCH) collision arbiter circuit/module 312, a paging channel/indicator monitoring circuit/module 320, and/or a subscription selection circuit/module 322. The paging channel (PCH) collision arbiter circuit/module 312 may include circuitry and/or programming (e.g., programming stored on the storage medium 306, such as the PCH collision arbiter operations 318) configured to determine whether a potential collision exists between paging indicator on different channels associated with different subscriptions. The paging channel (PCH) collision arbiter circuit/module 312 may also determine whether a time period between a paging indicator bit associated with a first subscription module and a second paging channel is greater than or equal to an amount of time it takes the access terminal to switch from operating on the first subscription module to operating on the second subscription module. The paging channel/indicator monitoring circuit module 320 may include circuitry and/or programming (e.g., programming stored on the storage medium 306, such as the paging channel/indicator monitoring operations 324) configured to monitor a paging channel and/or paging indicator within a paging channel. The subscription selection circuit module 322 may include circuitry and/or programming (e.g., programming stored on the storage medium 306, such as the subscription selection 326) configured to select/switch between two or more subscriptions and/or determine which subscription's paging channel to receive among a plurality of subscriptions.

The communications interface 304 is configured to facilitate wireless communications of the access terminal 300. For example, the communications interface 304 may include circuitry and/or programming configured to facilitate the communication of information bi-directionally with respect to one or more wireless network devices (e.g., network nodes). The communications interface 304 may be coupled to one or more antennas (not shown), and includes wireless transceiver circuitry, including at least one receiver circuit 314 (e.g., one or more receiver chains) and at least one transmitter circuit 316 (e.g., one or more transmitter chains). In various implementations, the receiver circuit 314 can be configured as a single-band receiver configured to demodulate signals for only a single frequency at a given moment in time. In such instances, two or more subscription modules (e.g., SIM-A 308 and SIM-B 310) may share the receiver circuit 314 by receiving transmissions for one subscription at a time. That is, at any given moment in time, only one subscription module, SIM-A 308 or SIM-B 310, may receive communications via the receiver circuit 314. The multiple subscriptions can divide access to the receiver circuit 314 in any manner commonly known for sharing a receiver circuit 314 among a plurality of subscription modules. For instance, distinct time periods may be employed for the various subscription modules to take turns receiving wireless transmissions via the receiver circuit 314 of the communications interface 304.

The storage medium 306 may be one or more non-transitory computer-readable, machine-readable, and/or non-transitory processor-readable media or devices for storing data and processor executable code or instructions (e.g., software, firmware), electronic data, databases, or other digital information. The storage medium 306 may also be used for storing data that is manipulated by the processing circuit 302 when executing programming. The storage medium 306 may be any available non-transitory storage media that can be accessed by a general purpose or special purpose processor, including portable or fixed storage devices, optical storage devices, and various other mediums capable of storing, containing and/or carrying programming By way of example and not limitation, the storage medium 306 may include a non-transitory computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a FLASH memory device (e.g., card, stick, key drive), random access memory (RAM), read only memory (ROM), programmable ROM (PROM), erasable PROM (EPROM), electrically erasable PROM (EEPROM), a register, a removable disk, and/or other non-transitory mediums for storing programming, as well as any combination thereof.

The storage medium 306 may be coupled to the processing circuit 302 such that the processing circuit 302 can read information from, and write information to, the storage medium 306. That is, the storage medium 306 can be coupled to the processing circuit 302 so that the storage medium 306 is at least accessible by the processing circuit 302, including examples where the storage medium 306 is integral to the processing circuit 302 and/or examples where the storage medium 306 is separate from the processing circuit 302 (e.g., resident in the access terminal 300, external to the access terminal 300, distributed across multiple entities).

Programming stored by the storage medium 306, when executed by the processing circuit 302, causes the processing circuit 302 to perform one or more of the various functions and/or process steps described herein. For example, the storage medium 306 may include paging channel (PCH) collision arbiter operations 318, paging channel/indicator monitoring operations 324, and/or subscription selection operations 326.

The paging channel/indicator monitoring operations 324 may be configured to cause the processing circuit 302 (e.g., the paging channel/indicator monitoring circuit/module 320) to receive and/or monitor a paging indicator channel and/or paging channel for a paging indicator bit indicating an incoming paging message.

The paging channel (PCH) collision arbiter operations 318 may be configured to cause the processing circuit 302 (e.g., the paging channel (PCH) collision arbiter circuit/module 312) to determine whether there may be a collision between a first paging channel associated with a first subscription module and a second paging channel associated with a second subscription module. If so, the paging channel (PCH) collision arbiter operations 318 may also determine whether a time period between a paging indicator bit associated with the first subscription module and the second paging channel is greater than or equal to an amount of time it takes the access terminal to switch from operating on the first subscription module to operating on the second subscription module. The subscription selection operations 326 may be configured to cause the processing circuit 302 (e.g., the subscription selection circuit/module 322) to switch between operating on the first subscription module and operating on the second subscription module depending on whether there is no paging message indicated by the paging indicator bit or paging channel associated with a particular subscription. Thus, according to one or more aspects of the present disclosure, the processing circuit 302 is configured to perform (in conjunction with the storage medium 306) any or all of the processes, functions, steps and/or routines for any or all of the access terminals (e.g., access terminal 104, access terminal 300) described herein. As used herein, the term "adapted" in relation to the processing circuit 302 may refer to the processing circuit 302 being one or more of configured, employed, implemented, and/or programmed (in conjunction with the storage medium 306) to perform a particular process, function, step and/or routine according to various features described herein.

Figure 4:
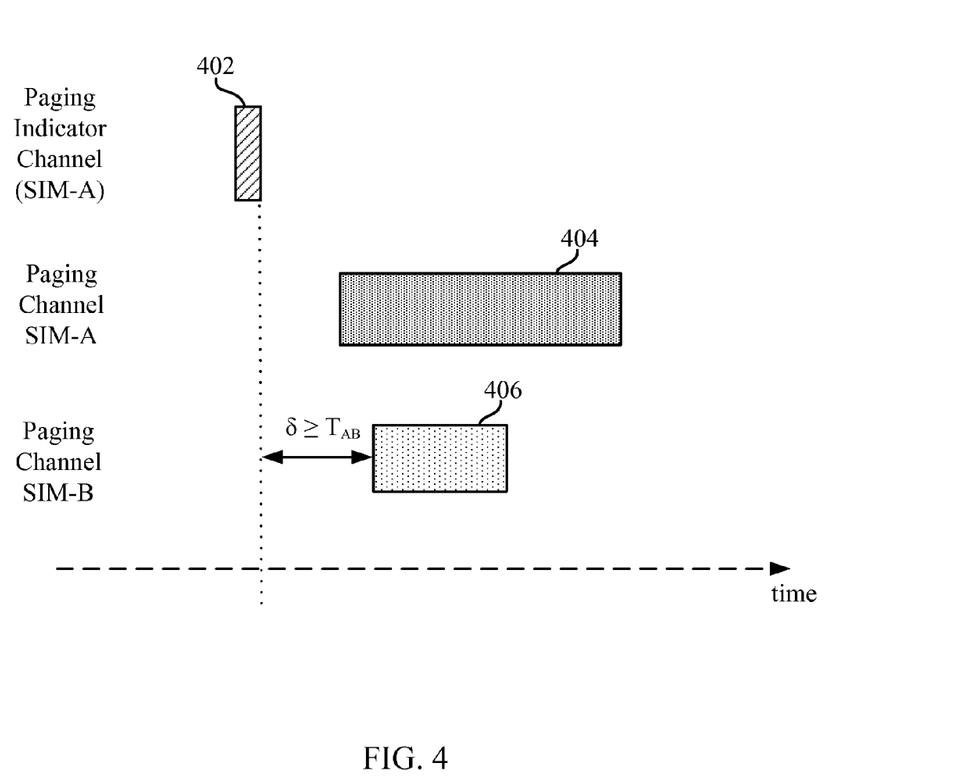
FIG. 4 is a block diagram illustrating an example of a scenario in which an access terminal may arbitrate paging channel collisions for multiple subscriptions.

In operation, SIM-A 308 and SIM-B 310 may be allocated a distinct paging channel through which paging messages can be received. The access terminal 300 is generally configured to monitor each paging channel for each subscription to monitor or receive incoming paging messages. FIG. 4 is a block diagram illustrating an example of a scenario in which an access terminal 300 may arbitrate paging channel collisions for multiple subscriptions.

In the example depicted in FIG. 4, the SIM-A (e.g., SIM-A 308 in FIG. 3) is shown as employing a Radio Access Technologies (RATs) configured to use a paging indicator bit on a paging indicator channel (ICH or PICH) before every paging channel slot (e.g., paging occasion). Some examples of radio access technologies that employ a page indicator bit include Long-Term Evolution (LTE) and Wideband Code Division Multiple Access (WCDMA).

Paging channel collisions occur if there exists a temporal overlap between paging channels (e.g., paging occasions) associated with different subscriptions employed by the access terminal 300. For example, in FIG. 4, a first paging channel 404 for SIM-A overlaps a second paging channel 406 for SIM-B. In this example, a paging indicator bit 402 is present/available and associated with SIM-A.

When the access terminal 300 has initially selected SIM-A, the access terminal 300 will initially monitor the paging indicator channel (ICH) for the paging indicator bit 402 for the first subscription, SIM-A. To switch between SIM-A and SIM-B, the access terminal 300 employs the processing circuit 302 to perform the switch. Typically, there is a determinable amount of processing time that it takes to transition between SIM-A and SIM-B. In the depicted example, $T_{AB}$ represents the processing time required for transitioning between SIM-A to SIM-B. Additionally, $\delta$ represents the amount of time between the paging indicator bit 402 for the first SIM-A and the second paging channel 406 (e.g. paging occasion) for SIM-B.

According to at least one example, the access terminal 300 can monitor both SIM-A and SIM-B paging channels in certain situations when $\delta \geq T_{AB}$. For instance, in the example shown in FIG. 4, with the access terminal 300 monitoring SIM-A prior to the collision of the first paging channel 404 and the second paging channel 406, the paging indicator bit 402 may indicate that there is no paging message for the first paging channel 404. Since the time between the paging indicator bit 402 for SIM-A and the paging channel for SIM-B is long enough for the processing circuit 302 to switch from SIM-A to SIM-B (e.g., $\delta \geq T_{AB}$), the processing circuit 302 can switch from SIM-A to SIM-B to facilitate monitoring of the second paging channel 406 associated with SIM-B. In this instance, although paging channel collision is predicted (e.g., collision of the first paging channel 404 and second paging channel 406), the access terminal 300 can still monitor for paging messages from both subscriptions (e.g., SIM-A and SIM-B).

On the other hand, if the access terminal 300 determines from the paging indicator bit 402 that a paging message is expected on the first paging channel 404, then the access terminal 300 can continue monitoring SIM-A, including the first paging channel 404. In this example, the access terminal 300 will skip monitoring the second paging channel 406 associated with SIM-B.

Figure 5:
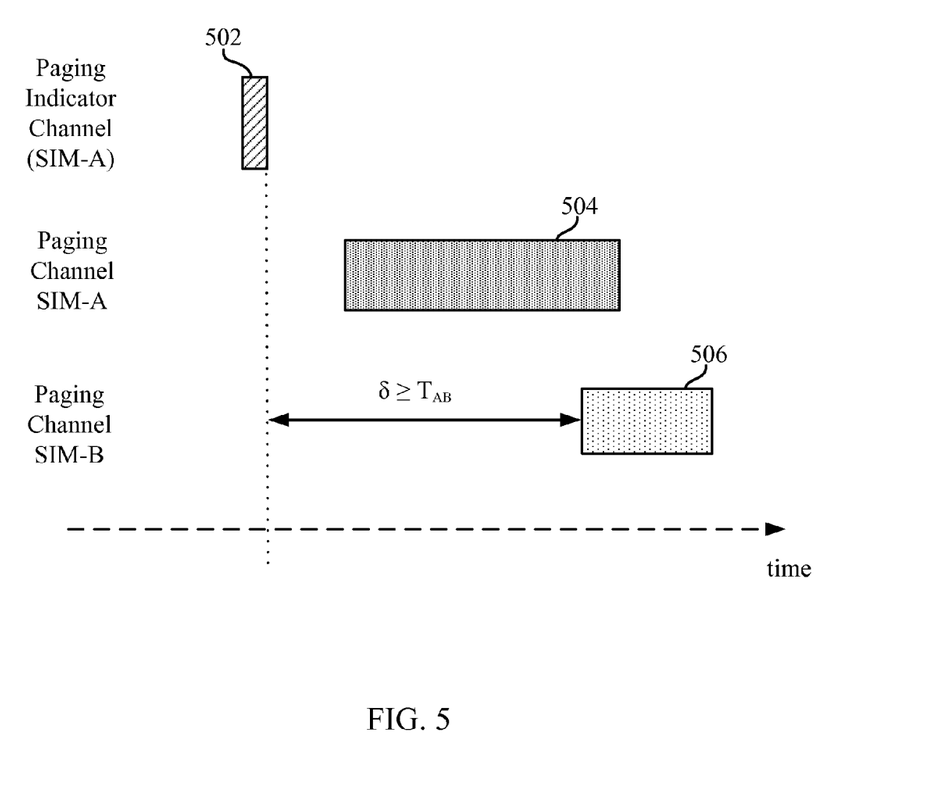
FIG. 5 is a block diagram illustrating another example of a scenario in which an access terminal may arbitrate paging channel collisions for multiple subscriptions.

Turning to FIG. 5, a block diagram is depicted illustrating an example of another scenario in which an access terminal 300 may arbitrate paging channel collisions for multiple subscriptions. In this example, the access terminal 300 has initially selected the second subscription (SIM-B), so it is initially monitoring the second paging channel 506 associated with SIM-B. As noted above, $T_{AB}$ is the processing time required for transitioning between SIM-A to SIM-B (or vice versa), and $\delta$ is the time gap between the paging indicator bit (ICH) 502 for the first subscription (SIM-A) and the second paging channel 506 (e.g. paging occasion) for SIM-B. If the time between the paging indicator bit 502 and the second paging channel 506 is greater than or equal to the time it takes the processing circuit 302 to switch between the two subscriptions (e.g., $\delta \geq T_{AB}$), then there is sufficient time to switch from SIM-B to SIM-A and monitor the paging indicator bit 502 for SIM-A. If the paging indicator bit 502 associated with SIM-A indicates a paging message is expected in the first paging channel 504 for SIM-A, then the access terminal 300 can stay on SIM-A to monitor the first paging channel 304. If, on the other hand, the access terminal 300 determines from the paging indicator 502 that a paging message is not expected on the first paging channel 504, then the processing circuit 300 can switch from SIM-A back to SIM-B with sufficient time to monitor the second paging channel 506.

This approach increases the probability of receiving a mobile terminated (MT) call, for the simple fact that a paging message for SIM-B is not guaranteed in the second paging channel 506 associated with SIM-B. However, skipping the first paging channel 504 associated with SIM-A to monitor for a paging message for SIM-B that is not guaranteed may result in missing a paging message for SIM-A.

Although there is no paging indicator channel or paging indicator bit depicted in FIGS. 4 and 5 as being associated with the second subscription (SIM-B), those of ordinary skill in the art will understand that the second subscription (SIM-B) may also employ a paging indicator bit in various examples.

Figure 6A:
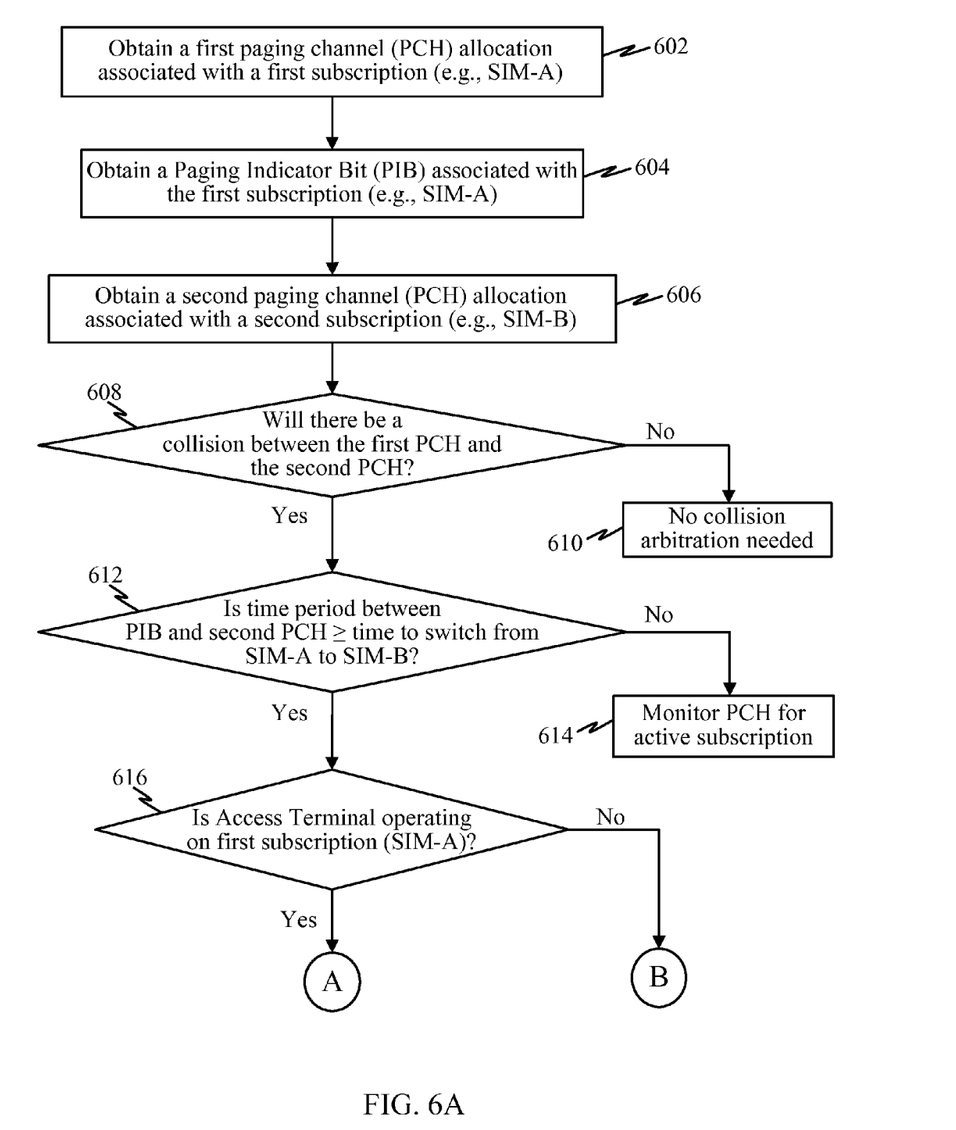
FIGS. 6A and 6B, is a flow diagram illustrating a method operational on an access terminal according to at least one example.
Figure 6B:
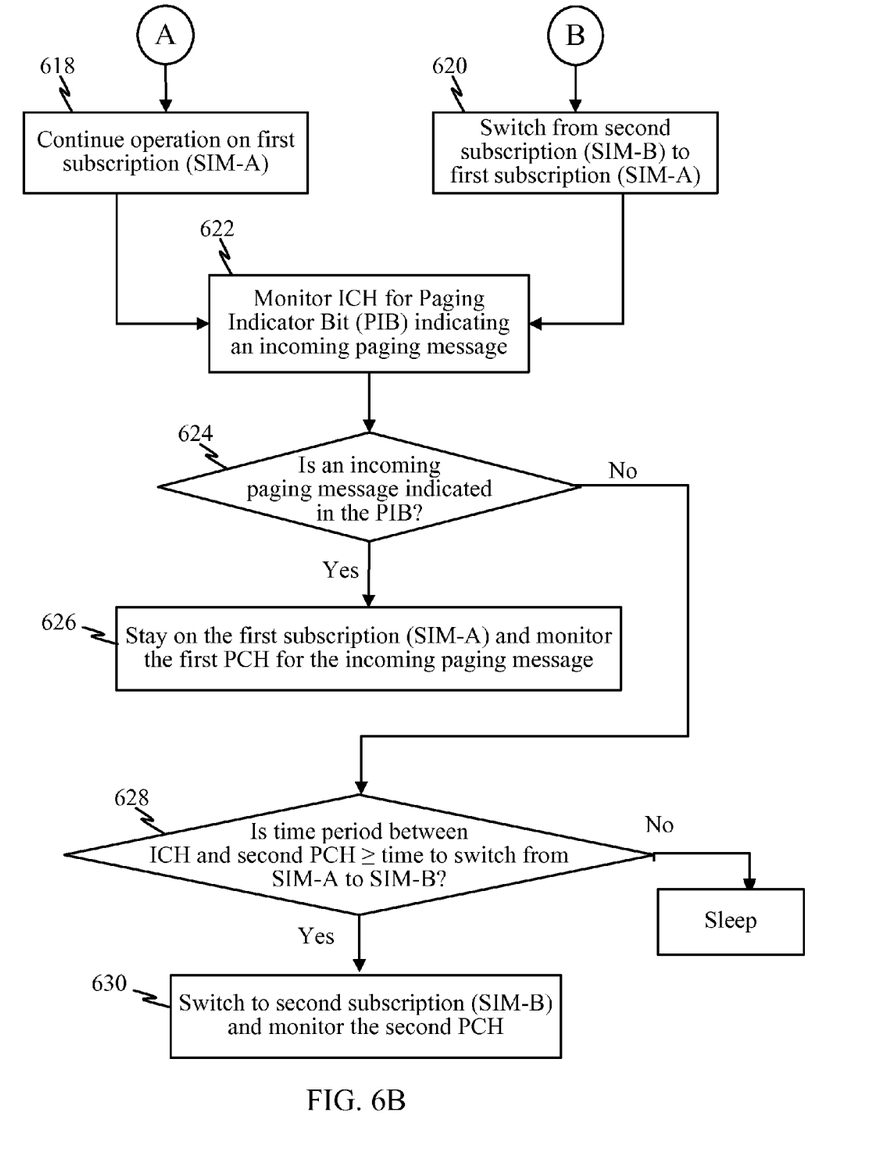

FIG. 6, comprising FIGS. 6A and 6B, is a flow diagram illustrating at least one example of a method operational on an access terminal, such as the access terminal 300. Referring to FIGS. 3 and 6, an access terminal 300 can obtain a first paging channel (PCH) allocation associated with a first subscription (e.g., SIM-A 308) at 602, and can obtain a paging indicator bit associated with the first subscription (SIM-A 308) at 604. For example, the processing circuit 302 may operate on the first subscription (SIM-A 308) to obtain the first paging channel allocation and the paging indicator bit associated with the first subscription module, SIM-A 308, At 606, the access terminal 300 can also obtain a second paging channel allocation associated with the second subscription (e.g., SIM-B 310). For instance, the processing circuit 302 may operate on the second subscription (SIM-B 310) to obtain the second paging channel allocation associated with the second subscription module, SIM-B 310. In some examples, the second subscription may operate in a radio access technology that also employs a paging indicator bit. In such instances, the processing circuit 302 may also obtain a paging indicator bit associated with the second subscription module, SIM-B 310.

At 608, the access terminal 300 determines whether there will be a collision between the first paging channel and the second paging channel. For instance, the processing circuit 302 (e.g., the paging channel collision arbiter circuit/module 312 and/or paging channel/indicator monitoring circuit/model 320) executing the paging channel collision arbiter operations 318 and/or paging channel/indicator monitoring operations 324 may determine if there will be a collision between the first paging channel and the second paging channel. In at least some examples, such a determination may be made by identifying whether the first paging channel associated with the first subscription module (SIM-A 308) is scheduled to at least partially overlap with the second paging channel associated with the second subscription module (SIM-B 310).

If no collision is detected between the first and second paging channels, then the access terminal 300 can continue with conventional operations for monitoring the various paging channels for multiple subscriptions, at 610.

On the other hand, however, if the access terminal 300 determines that a collision will occur, the access terminal 300 can make a determination at 612 whether the time period between the paging indicator bit (PIB) for the first subscription (SIM-A 308) and the second paging channel for the second subscription (SIM-B 310) is greater than or equal to the time it takes to switch from operating on the first subscription module (SIM-A 308) to operating on the second subscription module (SIM-B 310). For example, the processing circuit 302 (e.g., the paging channel arbiter 312) executing the paging channel collision operations 318 may determine whether the time between the paging indicator bit for SIM-A 308 and the second paging channel for SIM-B 310 is greater than or equal to the time it takes the processing circuit 302 to switch between the two subscription modules (e.g., $\delta \geq T_{AB}$), as described above.

If the access terminal 300 determines that the time period between the paging indicator bit and the second paging channel is less than (i.e., not greater than or equal to) the time it takes to switch between SIM-A 308 and SIM-B 310 (e.g., $\delta < T_{AB}$), then the access terminal 300 continue to monitor the paging channel for the active subscription at 614. For instance, if the access terminal 300 is currently operating on the first subscription module (SIM-A 308) when the collision is detected, but time between the paging indicator bit and the second paging channel is too short, the processing circuit 302 (e.g., the paging channel arbiter 312) executing the paging channel collision operations 318 may continue operation on the first subscription module (SIM-A 308) whereby the paging indicator bit and potentially the first paging channel are monitored, while the second paging channel is skipped. On the other hand, if the access terminal 300 is currently operating on the second subscription module (SIM-B 310) when the collision is detected, but the time between the paging indicator bit and the second paging channel is too short, the processing circuit 302 (e.g., the paging channel arbiter 312) executing the paging channel collision operations 318 may continue operation on the second subscription module (SIM-B 310) whereby the second paging channel is monitored, while the paging indicator bit and the first paging channel are skipped.

If the access terminal 300 determines that the time period between the paging indicator bit and the second paging channel is greater than or equal to the time it takes to switch between SIM-A 308 and SIM-B 310 (e.g., $\delta \geq T_{AB}$), then the access terminal 300 can employ one or more of the features described herein to potentially monitor for pages on both subscriptions. At 616, the access terminal 300 determines whether it is currently operating on the first subscription (SIM-A 308) or the second subscription (SIM-B 310. For instance, the processing circuit 302 (e.g., the paging channel arbiter 312) executing the paging channel collision operations 318 may make a determination whether the access terminal 300 is currently operating on the first subscription module (SIM-A 308) or the second subscription module (SIM-B 310).

If the access terminal 300 determines that it is currently operating on the first subscription module (SIM-A 308), then the flow on FIG. 6A follows connector 'A' to FIG. 6B where the access terminal 300 continues to operate on the first subscription (SIM-A 308) at 618. That is, the processing circuit 302 (e.g., the paging channel arbiter 312) executing the paging channel collision operations 318 can continue operation on the first subscription module (SIM-A 308).

On the other hand, if the access terminal 300 determines that it is currently operating on the second subscription module (SIM-B 310), then the flow on FIG. 6A follows connector 'B' to FIG. 6B, where the access terminal 300 switches, at 620, from the second subscription (SIM-B 310) to the first subscription (SIM-A 308). For example, the processing circuit 302 (e.g., the paging channel arbiter 312) executing the paging channel collision operations 318 may switch from operating on the second subscription module (SIM-B 310) to operating on the first subscription module (SIM-A 308).

With the access terminal 300 currently operating on the first subscription in both cases (e.g., flows 'A' and 'B'), the access terminal 300 can monitor the paging indicator channel (ICH) for a paging indicator bit indicating an incoming paging message at 622. That is, the processing circuit 302 (e.g., the paging channel arbiter 312) executing the paging channel collision operations 318 may monitor the paging indicator channel for a paging indicator bit associated with the first subscription (SIM-A 308) via the receiver circuit 314 of the communications interface 304.

At 624, a determination is made whether the paging indicator bit (PIB) indicates that an incoming paging message is expected on the first paging channel. For example, the processing circuit 302 (e.g., the paging channel arbiter 312) executing the paging channel collision operations 318 can receive a paging indicator bit on the paging indicator channel to determine whether an incoming paging message will be transmitted on the first paging channel.

If the paging indicator bit indicates that a paging message is incoming on the first paging channel at 624, then the access terminal 300 can stay on the first subscription (SIM-A 308) and can monitor the first paging channel for the incoming page, at 626. For instance, the processing circuit 302 (e.g., the paging channel arbiter 312) executing the paging channel collision operations 318 can continue operation on the first subscription module (SIM-A 308). The processing circuit 302 (e.g., the paging channel arbiter 312) executing the paging channel collision operations 318 can further monitor the first paging channel for the incoming paging message via the receiver circuit 314 of the communications interface 304. In this scenario, the second paging channel will be skipped.

If, on the other hand, the paging indicator bit indicates that a paging message is not incoming on the first paging channel at 624, then the access terminal 300 can switch to the second subscription (SIM-B 310) and can monitor the second paging channel for any incoming pages. At step 628, if the time period between the indicator channel for the first subscription (SIM-A 308) and the second paging channel for the second subscription (SIM-B 310) is greater than or equal to the time it takes to switch from operating on the first subscription module (SIM-A 308) to operating on the second subscription module (SIM-B 310), then a switch to the second subscription (SIM-B) can occur and the second paging channel may be monitored for any incoming pages, at 630. Otherwise, if there is insufficient time to switch from the first subscription (SIM- A) to the second subscription (SIM-B), then the access terminal 300 can stay on the first subscription (SIM-A 308), at 626. In one example, the processing circuit 302 (e.g., the paging channel arbiter 312) executing the paging channel collision operations 318 may switch from operating on the first subscription module (SIM-A 308) to operating on the second subscription module (SIM-B 310). The processing circuit 302 (e.g., the paging channel collision arbiter circuit/module 312 and/or the paging channel/indicator monitoring circuit/module 322) executing the paging channel collision arbiter operations 318 and/or paging channel/indicator monitoring operations 324 can further monitor the second paging channel for incoming paging messages via the receiver circuit 314 of the communications interface 304.

While the above discussed aspects, arrangements, and embodiments are discussed with specific details and particularity, one or more of the components, steps, features and/or functions illustrated in FIGS. 1, 2, 3, 4, 5, and/or 6 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, and/or 3 may be configured to perform or employ one or more of the methods, features, parameters, and/or steps described in FIGS. 4, 5, and/or 6. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. Words such as "thereafter," "then," "next," etc. are not intended to limit the order of the operations; these words are simply used to guide the reader through the description of the methods. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a non-transitory machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
a communications interface; and
a processing circuit coupled to the communications interface, wherein the processing circuit is configured to:
determine whether there will be a collision between a first paging channel associated with a first subscription module associated with a first subscription and a second paging channel associated with a second subscription module associated with a second subscription;
determine whether a time period between a paging indicator bit associated with the first subscription module and a paging channel occurrence on the second paging channel is greater than or equal to an amount of time it takes the processing circuit to switch from the first subscription to the second subscription, in response to determining that there will be a collision;
remain on the first subscription and monitor a paging indicator channel for the first subscription and the first paging channel in response to determining that the time period between a paging indicator bit associated with the first subscription module and the paging channel occurrence on the second paging channel is not greater than or equal to an amount of time it takes the processing circuit to switch from the first subscription to the second subscription when the processing circuit is currently operating on the first subscription;
monitor the paging indicator channel via the communications interface for a paging indicator bit indicating an incoming paging message for the first subscription in response to determining that the time period between a paging indicator bit associated with the first subscription module and the paging channel occurrence on the second paging channel is greater than or equal to an amount of time it takes the processing circuit to switch from the first subscription to the second subscription;
switch from the first subscription to the second subscription when there is no paging message indicated by the paging indicator bit; and
monitor the second paging channel via the communications interface for an incoming paging message.

2. The access terminal of claim 1, wherein the communications interface comprises a receiver circuit configured to receive communications on one frequency band at a time.

3. The access terminal of claim 2, wherein the first subscription module and the second subscription module share the receiver circuit for receiving wireless transmissions one subscription at a time.

4. The access terminal of claim 1, wherein the processing circuit is configured to employ the communications interface to receive transmissions for both the first subscription module and the second subscription module, wherein transmissions are received for one subscription module at a time.

5. The access terminal of claim 1, wherein the processing circuit is further configured to:

determine whether the processing circuit is currently operating on the second subscription prior to monitoring for the paging indicator bit; and
switch from the second subscription to the first subscription to monitor for the paging indicator bit in response to determining that the processing circuit is currently operating on the second subscription.

6. The access terminal of claim 1, wherein the processing circuit is further configured to:
determine whether the processing circuit is currently operating on the first subscription prior to monitoring for the paging indicator bit; and
remain on the first subscription to monitor for the paging indicator bit in response to determining that the processing circuit is currently operating on the first subscription.

7. The access terminal of claim 1, wherein the processing circuit is further configured to:
monitor the second paging channel in response to determining that an incoming paging message is not indicated in the paging indicator bit and the time period between a paging indicator bit associated with the first subscription module and the paging channel occurrence on the second paging channel is greater than or equal to an amount of time it takes the processing circuit to switch from the first subscription to the second subscription when the processing circuit is currently operating on the second subscription.

8. The access terminal of claim 1, wherein the processing circuit is further configured to:
remain on the first subscription when an incoming paging message is indicated by the paging indicator bit; and
monitor the first paging channel.

9. A method operational on an access terminal, comprising:
determining whether there will be a collision between a first paging channel associated with a first subscription module associated with a first subscription and a second paging channel associated with a second subscription module associated with a second subscription;
determining whether a time period between a paging indicator bit associated with the first subscription module and a paging channel occurrence on the second paging channel is greater than or equal to an amount of time it takes the access terminal to switch from operating on the first subscription module to operating on the second subscription module in response to determining that there will be a collision;
remaining on the first subscription and monitoring a paging indicator channel for the first subscription and the first paging channel in response to determining that a time period between a paging indicator bit associated with the first subscription module and the paging channel occurrence on the second paging channel is not greater than or equal to an amount of time it takes the access terminal to switch from operating on the first subscription module to operating on the second subscription module when the access terminal is currently operating on the first subscription module;
monitoring the paging indicator channel for a paging indicator bit indicating an incoming paging message in response to determining that the time period between a paging indicator bit associated with the first subscription module and the paging channel occurrence on the second paging channel is greater than or equal to an amount of time it takes the access terminal to switch from the first subscription to the second subscription;
switching from operating on the first subscription module to operating on the second subscription module when there is no paging message indicated by the paging indicator bit; and
monitoring the second paging channel for incoming paging messages.

10. The method of claim 9, wherein determining whether there will be a collision between the first paging channel and the second paging channel comprises:
determining whether the first paging channel is scheduled to at least partially overlap with the second paging channel.

11. The method of claim 9, further comprising:
determining whether the access terminal is currently operating on the second subscription module prior to monitoring for the paging indicator bit; and
switching from operating on the second subscription module to operating on the first subscription module prior to monitoring for the paging indicator bit in response to determining that the access terminal is currently operating on the second subscription module.

12. The method of claim 9, further comprising:
determining whether the access terminal is currently operating on the first subscription module prior to monitoring for the paging indicator bit; and
continuing operation on the first subscription module to monitor for the paging indicator bit in response to determining that the access terminal is currently operating on the first subscription module.

13. The method of claim 9, further comprising:
monitoring the second paging channel in response to determining that an incoming paging message is not indicated in the paging indicator bit and the time period between a paging indicator bit associated with the first subscription module and the paging channel occurrence on the second paging channel is greater than or equal to an amount of time it takes the access terminal to switch from operating on the first subscription module to operating on the second subscription module when the access terminal is currently operating on the second subscription module.

14. The method of claim 9, further comprising:
continuing to operate on the first subscription module when an incoming paging message is indicated by the paging indicator bit; and
monitoring the first paging channel for incoming paging messages.

15. An access terminal, comprising:
means for determining whether there will be a collision between a first paging channel associated with a first subscription module associated with a first subscription and a second paging channel associated with a second subscription module associated with a second subscription;
means for determining whether a time period between a paging indicator bit associated with the first subscription module and a paging channel occurrence on the second paging channel is greater than or equal to an amount of time it takes the access terminal to switch from operating on the first subscription module to operating on the second subscription module in response to determining that there will be a collision between a first paging channel associated with a first subscription module and a second paging channel associated with a second subscription module;
means for remaining on the first subscription and monitoring a paging indicator channel for the first subscription and the first paging channel when the access terminal is currently operating on the first subscription module in response to determining that a time period between a paging indicator bit associated with the first subscription module and the paging channel occurrence on the second paging channel is not greater than or equal to an amount of time it takes the access terminal to switch from operating on the first subscription module to operating on the second subscription module;

means for monitoring the paging indicator channel for a paging indicator bit indicating an incoming paging message in response to determining that a time period between a paging indicator bit associated with the first subscription module and the paging channel occurrence on the second paging channel is greater than or equal to an amount of time it takes the access terminal to switch from operating on the first subscription module to operating on the second subscription module;

means for switching from operating on the first subscription module to operating on the second subscription module when there is no paging message indicated by the paging indicator bit; and means for monitoring the second paging channel for incoming paging messages.

16. The access terminal of claim 15, further comprising:
means for determining whether the access terminal is currently operating on the second subscription module prior to monitoring for the paging indicator bit; and
means for switching from operating on the second subscription module to operating on the first subscription module in response to determining that the access terminal is currently operating on the second subscription module.

17. The access terminal of claim 15, further comprising:
means for monitoring the second paging channel when the access terminal is currently operating on the second subscription module.

18. The access terminal of claim 15, further comprising:
means for continuing operation on the first subscription module when an incoming paging message is indicated by the paging indicator bit; and
means for monitoring the first paging channel for incoming paging messages.

19. A non-transitory processor-readable storage medium storing processor executable instructions which, when executed by a processing circuit of an access terminal, cause the processing circuit to:
determine whether a first paging channel associated with a first subscription module associated with a first subscription is scheduled to at least partially overlap with a second paging channel associated with a second subscription module associated with a second subscription;
determine whether a time period between a paging indicator bit associated with the first subscription module and a paging channel occurrence on the second paging channel is greater than or equal to an amount of time it takes the access terminal to switch from operating on the first subscription module to operating on the second subscription module in response to determining that a first paging channel associated with a first subscription module is scheduled to at least partially overlap with a second paging channel associated with a second subscription module;
remain on the first subscription and monitor a paging indicator channel for the first subscription and the first paging channel when the access terminal is currently operating on the first subscription module in response to determining that a time period between a paging indicator bit associated with the first subscription module and the paging channel occurrence on the second paging channel is not greater than or equal to an amount of time it takes the access terminal to switch from operating on the first subscription module to operating on the second subscription module;
monitor the paging indicator channel for an indication of an incoming paging message in response to determining that a time period between a paging indicator bit associated with the first subscription module and the paging channel occurrence on the second paging channel is greater than or equal to an amount of time it takes the access terminal to switch from operating on the first subscription module to operating on the second subscription module;
switch from operating on the first subscription module to operating on the second subscription module when there is no paging message indicated by the paging indicator bit; and
monitor the second paging channel for incoming paging messages.

20. The non-transitory processor-readable storage medium of claim 19, further storing processor executable instructions which, when executed by the processing circuit, cause the processing circuit to:
determine whether the access terminal is currently operating on the second subscription module prior to monitoring the paging indicator bit; and
switch from operating on the second subscription module to operating on the first subscription module prior to monitoring the paging indicator bit in response to determining that the access terminal is currently operating on the second subscription module.

21. The non-transitory processor-readable storage medium of claim 19, further storing processor executable instructions which, when executed by at least one processing circuit, cause the processing circuit to:
determine whether the access terminal is currently operating on the first subscription module prior to monitoring the paging indicator bit; and
continue operation on the first subscription module to monitor the paging indicator bit the processing circuit is currently operating on the first subscription in response to determining that the access terminal is currently operating on the first subscription module.

22. The non-transitory processor-readable storage medium of claim 19, further storing processor executable instructions which, when executed by at least one processing circuit, cause the processing circuit to:
monitor the second paging channel when the access terminal is currently operating on the second subscription module.

23. The non-transitory processor-readable storage medium of claim 19, further storing processor executable instructions which, when executed by at least one processing circuit, cause the processing circuit to:
continue to operate on the first subscription module when an incoming paging message is indicated by the paging indicator bit; and
monitor the first paging channel for incoming paging messages.

* * * * *